United States Patent [19]

Pencé

[11] Patent Number: 4,732,522
[45] Date of Patent: Mar. 22, 1988

[54] INSTALLATION FOR LOADING AND UNLOADING PARTS INTO AND FROM A CONTAINER

[76] Inventor: Anne M. Pencé, Courcelles, 89570 Neuvy-Sautour, France

[21] Appl. No.: 869,967

[22] Filed: Jun. 2, 1986

[30] Foreign Application Priority Data

Jun. 12, 1985 [FR] France .................. 85 08869

[51] Int. Cl.$^4$ .................. B65G 59/04; B65G 65/08
[52] U.S. Cl. .................. 414/118; 53/236; 53/247; 53/260; 53/535; 414/68; 414/82; 414/117; 414/122; 414/416; 414/748
[58] Field of Search .................. 414/63, 68, 82, 117, 414/118, 122, 272, 273, 280, 224, 745, 748, 416, 786; 53/236, 247, 260, 535, 537

[56] References Cited

U.S. PATENT DOCUMENTS

| | | | |
|---|---|---|---|
| 2,869,737 | 1/1959 | Thomas | 414/82 X |
| 3,434,603 | 3/1969 | Horman | 414/68 X |
| 3,526,326 | 9/1970 | Castaldi | 414/273 |
| 3,788,497 | 1/1974 | Carlson | |
| 4,299,524 | 11/1981 | Sawada et al. | |
| 4,339,220 | 7/1982 | Pukda | 414/84 |
| 4,439,099 | 3/1984 | Asari et al. | 414/57 X |
| 4,580,938 | 4/1986 | Mojden et al. | 414/119 |
| 4,608,808 | 9/1986 | Ryan et al. | 53/260 X |

FOREIGN PATENT DOCUMENTS

| | | | |
|---|---|---|---|
| 2842910 | 4/1980 | Fed. Rep. of Germany | 414/748 |
| 2387179 | 11/1978 | France | |
| 55-111323 | 8/1980 | Japan | 414/748 |

Primary Examiner—Leslie J. Paperner
Attorney, Agent, or Firm—Young & Thompson

[57] ABSTRACT

An installation for handling parts between a container in which they are placed in layers and piles and a table which cooperates with a chute joining the installation to a service machine. The installation comprises a table mobile horizontally relative to the frame, structure for displacing in a controlled manner the table so that its free end protrudes with respect to the frame free end, and at least one container formed of at least one bottom and three fixed vertical side walls. The face of the container without a vertical wall has a width slightly greater than the width of the table free end. An elevator is placed opposite the frame in the direction of mobility of the table and is adapted to move vertically in a controlled manner. A container with its face without a vertical wall is in register with the table so that the end of said table can be introduced in the container. Structure is provided for displacing parts substantially horizontally between the inside of the container and the end surface of the table.

8 Claims, 8 Drawing Figures

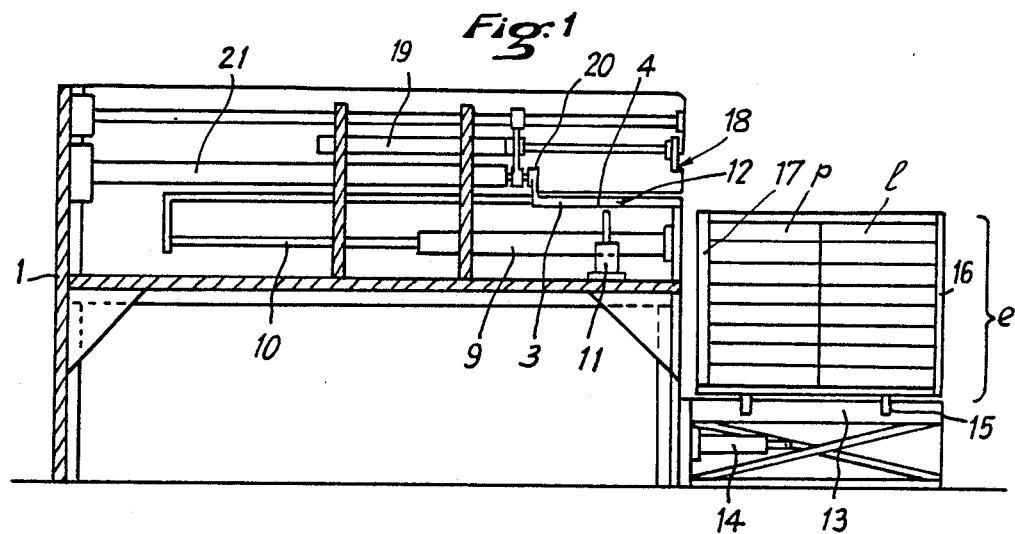
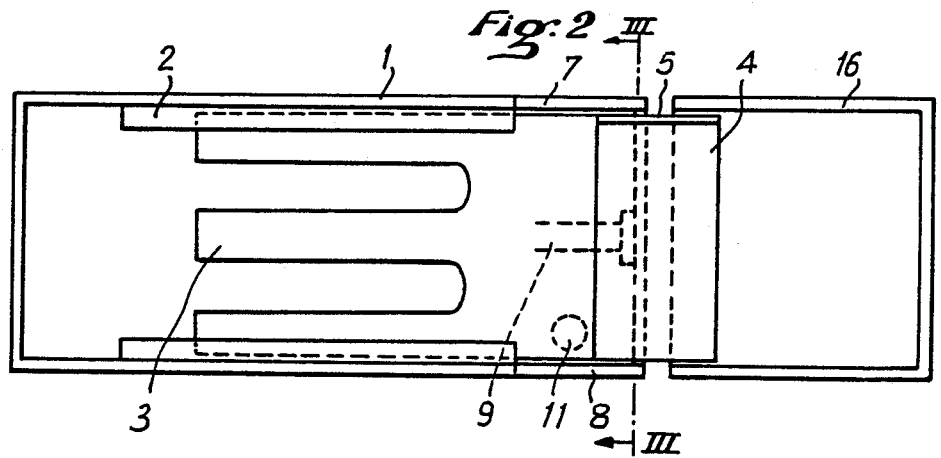
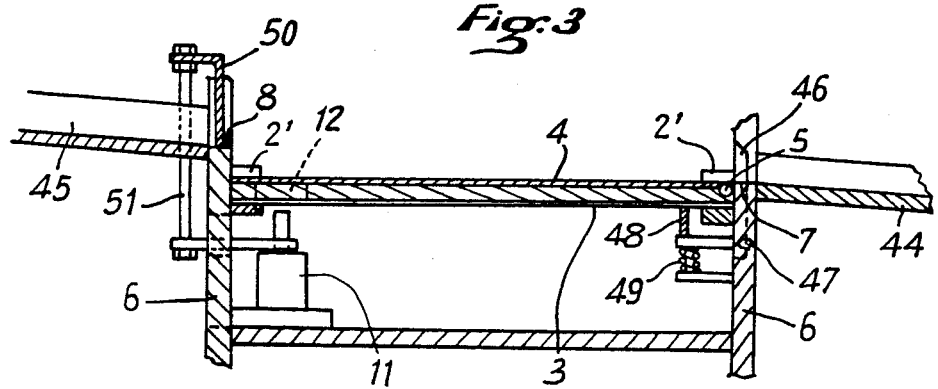

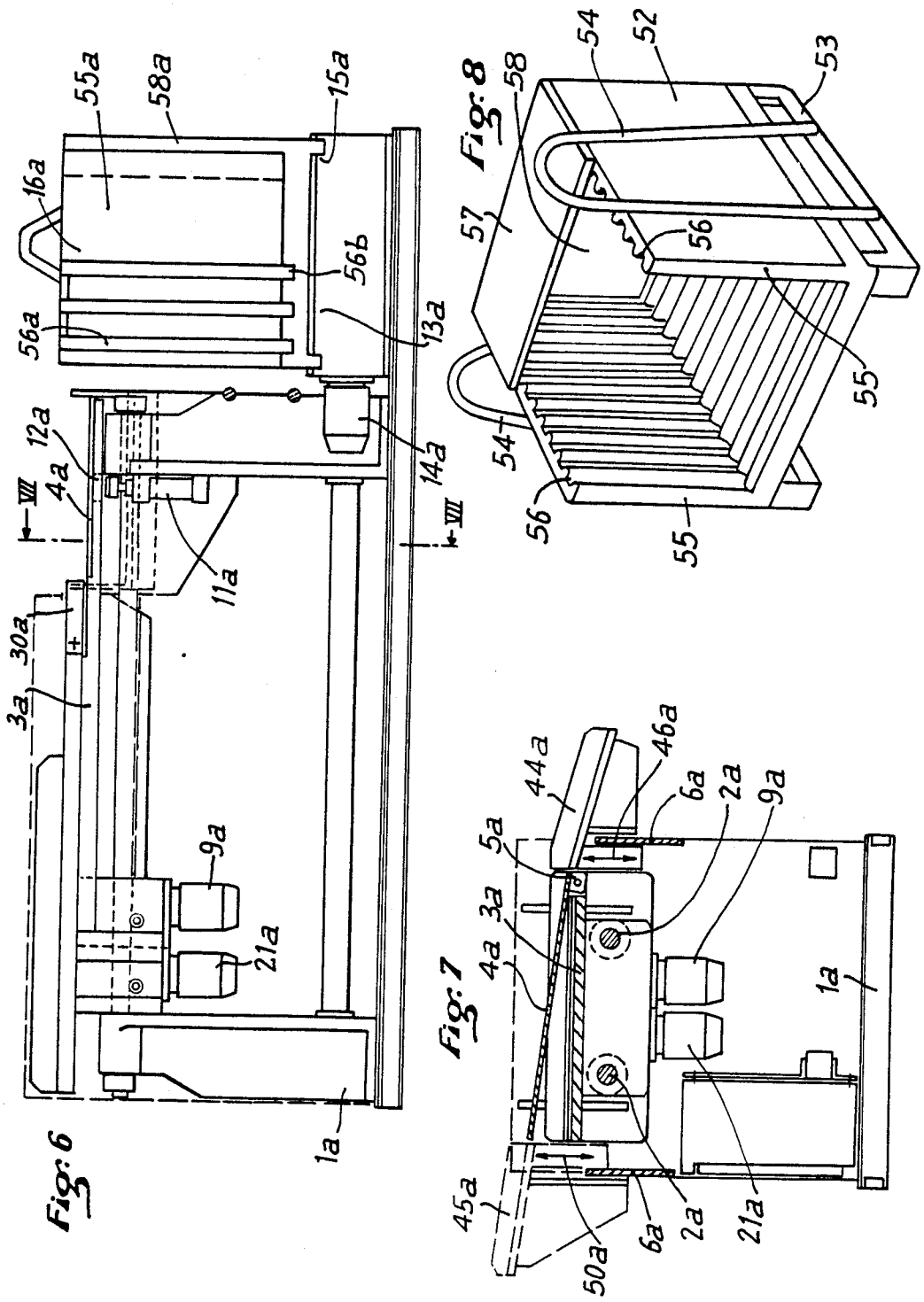

INSTALLATION FOR LOADING AND UNLOADING PARTS INTO AND FROM A CONTAINER

FIELD OF INVENTION

The present invention relates to the handling of parts and notably of cylindrical tubular parts. In practice, the object of the handling operation can be the removal of said parts from containers in order to feed metal working machines, and the loading of said cylindrical or tubular parts in containers with a view to their storage, their transportation to another machining stage, or their conditioning for being dispatched.

In the usual technique, the parts are loaded most often in bulk in a container, and when it is necessary to place them generating line against generating line in the feeding chute of a machine, they are poured onto an inclined feeding plate which in subjected to vibrations in order to distribute them in a single layer, with the parts being placed parallel to each other. In this type of apparatus, the parts are subjected to impacts, hence the risk of marks imprinted on them when they are metallic parts, or even of breakages when the parts are made of a fragile material.

Attempts have also been made to handle them with robots, the robot providing a positioning of the part perferably defined during loading as well as unloading. The robot solution is much more costly than that previously known, which consisted in feeding and discharge chutes in which the cylindrical or tubular parts can roll; and the handling part by part by means of a robot is a relatively slow operation.

OBJECTS AND SUMMARY OF INVENTION

The loading in a container and unloading from said container cylindrical or tubular parts is characterized in that a container is provided, a vertical wall of which is removable, in that said container is placed in front of and adjacent a table the width of which at the end is slightly less than the inner width of the side of the container removable wall, on which table are fed or have to be placed the cylindrical parts, which bear against each other side by side on their generating lines, with the face of the container the removable wall of which has been removed facing said table, the length of the container perpendicularly to said removable wall corresponding substantially to a multiple of the length of a cylindrical part, the height of the container being such as to bring slightly above the level of the table plane the lower level of the upper layer or upper bed of cylindrical parts to be discharged, or slightly below said level, which is the upper level of the upper bed of the cylindrical parts already loaded in the container, the parts of a bed which are in the container bearing against the side faces of said container, or the parts of a layer which is on the table. The table has substantially the width of a bed of parts in the container, the table bearing via the parts at the ends of the layer against abutment elements coacting with said table, said table is being advanced in the container for bringing its end adjacent the end of the bed of parts which has to be unloaded, or adjacent the end of the bed of parts already loaded and on which has to be loaded a bed of parts which is on the table and transports in a single block the cylindrical parts forming a bed from the table in order to lay them on the upper surface of the bed of parts which is in the container, or from the upper bed of the parts which is in the container for depositing them on the table, by a displacement in the direction of the parts length.

For the unloading operation, the table is displaced at the beginning of the unloading cycle of a bed in the direction of the container and introduced in said container substantially until a contact is established with the nearest vertical face of the stack of beds of parts, then, once the bed of parts has been brought by traction on the table, said table is moved rearwardly up to the unloading station situated outside the container where the parts are discharged from the table by rolling transversely to the direction of the table displacement.

For the loading operation, the table on which the parts are fed by having them roll transversely so as to form a bed is displaced in the direction of the container and introduced into said container in order to come slightly above the location where the parts have to be deposited and the table is progressively moved rearwardly while the parts are pushed or maintained in place for providing the relative displacement of the parts relative to said table.

An object of the present invention is also an installation for practicing the hereabove method, said installation comprising a frame, a table mobile horizontally according to one direction of said frame, means for displacing in a controlled manner said table along said direction so that its free end protrudes with respect to the frame free end, at least one container formed of at least one bottom and three fixed vertical side walls, the face without a vertical wall having a width slightly greater than the width of the table free end. An elevator means placed opposite the frame in the direction of mobility of the table is adapted to move vertically in a controlled manner a container with its face without side wall in register with the table so that the end of said table can be introduced in said container, and means for displacing parts substantially horizontally between the inside of said container and the end surface of the table.

According to another feature, the end of the table on which are deposited the parts, during their unloading or with a view to their loading, is formed of a shelf articulated to the table about one of its side edges, said shelf coming when the table is in a retracted position into register with the feeding chute or the discharge chute of known types joining the device to the machine serviced, and vice versa. Means are provided which allow varying the inclination of said shelf between the horizontal position and a predetermined inclined position.

According to another feature and for loading the container, the frame carrying the table is formed with an opening on its side edge which comes into resiger with the discharge chute of known type, which joins the machine serviced to the device, said opening being at the level of the shelf edge which is opposite the articulation in the upward position of the shelf and liftable dogs are provided at the end of said discharge chute and in register with said opening for retaining the parts on said chute when the table opening is not in alignment with the chute outlet.

According to other feature and when the parts to be handled are of a magnetic material, the means for displacing substantially horizontally the parts between the inside of said container and the table end surface is preferably an electromagnet occupying the whole width of the table and mobile to the front and to the rear with respect to said table. The electromagnet has indeed the advantage to possess a planar active surface which can be engaged against the upper portion of the frontal faces of the parts, independently of their length and section, and the power of the electromagnet can be easily modified as a function of the weight of the parts for avoiding entraining adjacent parts other than those of the handled bed. During operation, the electromagnet which retains the parts by a magnetic attraction also moves them from the container onto the table and from the table onto the upper bed of the forwardmost part stack.

When fragile tubular parts or parts made of a non-magnetic material are involved, the electromagnet can be replaced by a comb the tines of which come into engagement within the bores of the tubular parts or in the channels remaining in the stacks between the cylindrical parts. This picking device allows lifting and depositing the parts, but the comb has to be adapted at least to the section of the parts to be handled and has to possibly include a positioning corrector when the side position of the bed in the container varies beyond a certain tolerance.

According to another feature and when the unloading of the parts is involved, the table front edge carriers a detection crosspiece for the frontal face of the stack of parts forming the bed situated below the bed of parts to be unloaded, said detection crosspiece controlling by the depth of its position the stoppage of a motor device which controls the advance of the table and its reverse motion over a small distance.

According to another feature and when a loading of the parts is involved, the table front edge includes a sensor of the surface of the upper layer of parts on which the parts have to be deposited, such a sensor controlling the upward motion of the elevator carrying the container.

According to another feature, the container removable wall is engaged, by its side ends, into two vertical slots facing each other and formed in the two side walls of the container perpendicular to the removable wall, a plurality of slots being provided in each of said side walls. This arrangement allows setting the position of the removable side wall after having loaded a container as a function of the length of the parts and of the number of piles of parts placed end to end.

BRIEF DESCRIPTION OF THE DRAWINGS

The invention will be described hereinafter in more detail with reference to the accompanying drawings wherein:

FIG. 1 is a longitudinal sectional view of the installation according to the invention, FIG. 2 is a schematic plan view thereof, FIG. 3 is a sectional view on a larger scale and along line III—III of FIG. 2, FIG. 6 is a side elevation view of an installation according to another embodiment, FIG. 7 is a transverse sectional view along line VII—VII of FIG. 6, and FIG. 8 is a perspective view of a container for practicing the invention.

DETAILED DESCRIPTION OF THE INVENTION

Figure 4:
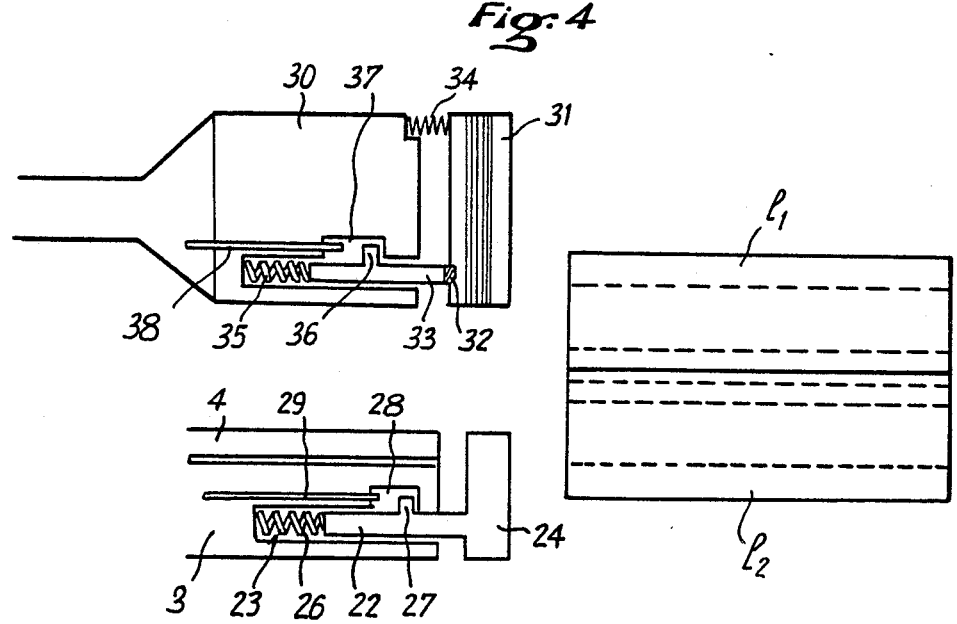
FIG. 4 is detailed sectional view of the front portion of the table and gripping arm.

The machine which is part of the installation of FIGS. 1 through 3 includes a frame 1 of rectangular shape, on the two sides of which are fixed two horizontal and parallel slides 2. In said slides 2 slide the edges of a table 3. On the front portion of said table 3 bears a shelf 4 which is articulated about a hinge 5. The frame side wall 6 and the slide upper wing 2' which are on the side of hinge 5 are interrupted over a length 7 corresponding to the width of plate 4 so that the upper edge 7 of said wall 6 will be at the level of the shelf side wall. On the other side, only the upper portion of wall 6 is suppressed over the same length in order to form an upper edge 8 of side wall 6 which is slightly above the level of table 3.

The sliding of table 3 on slides 2 is controlled by a jack 9 the end of the U-shaped stem 10 of the piston of which is rigidly connected to the table rear edge. A jack 11 carried by the frame is placed in such manner as to be, in the retracted position of table 3, below an opening 12 formed in table 3 on the opposite side with respect to hinge 5. Consequently, the stem of said jack 11 can lift shelf 4 in order to discharge, above the edge 7 adjacent which is a discharge channel 44, the cylindrical parts which have been brought onto the shelf or for bringing the edge of the shelf opposite hinge 5 to the same level as edge 8 which can form the end of a feed chute 45. In the latter case, the parts move downwardly along shelf 4 which is inclined for forming a bed on said shelf, the bed bearing via its first part against dogs 46 extending above edge 7. Said dogs 46 are for example L-shaped levers articulated at 47 to the frame and the other arm of which engages a cam 48, the dogs being retracted through the action of springs 49 when said dogs 46 are opposite a scallop of cam 48 corresponding to the alignment of shelf 4 with edge 7. When jack 11 moves shelf 4 downwardly, it closes simultaneously a door 50 above edge 8 for stopping the cylindrical parts which move downwardly in the feed chute 45. Door 50 is connected by a rod assembly 51 which could also be a transmission of any other type to the stem of jack 11.

Facing the front end of the frame is mounted a horizontal elevating plate 13 the vertical displacements of which are controlled by a jack 14 or any other known motive device. On elevator plate 13 can be mounted, while being perfectly centered by dogs 15, containers 16 adapted for receiving parts p, which are preferably cylindrical and tubular, which are disposed in layers l, the layers forming stacks e. In FIG. 1 is shown a container comprising two piles of eight layers. Wall 17 of the container is removable so that the frontal faces of the parts forming the stacks which are against said wall are exposed. Said wall 17 can be formed for example of two opening half-doors articulated along their vertical edges to the vertical edges of the side faces of the container and swingable on said side faces. Said wall 17 can be formed, in containers used for parts of variable lengths, by a double wall the thickness of which is settable so that wall 17 forms, after being put in position, a bearing surface for the front face of the frontal stack. Preferably however, the container is made as described hereafter with reference to FIG. 8.

In the case of an installation used for discharging articles, a sensor 18 mounted at the end of the stem of jack 19 can be moved above the elevator plate 13 for detecting the position of the upper layer of parts and controlling jack 14 so that the upper layer 1 of the frontal stack e is at the required level with respect to the table level. When the machine involved is a machine used for loading articles, an equivalent sensor is mounted underneath the table front edge for controlling jack 14 so that the table be, prior to the beginning of the loading process, at a small height above the upper layer of parts on which a new layer of parts is going to be placed.

The installation includes moreover a handling arm 20 adapted for being displaced along the displacement direction of table 3 via a jack 21 or other equivalent motive device.

As shown in FIG. 2, the end of table 3 which is below shelf 4 extends, when driven by jack 9, between the two side walls of container 16. In the front face of said table is slidably mounted a comb 24 with a number of fingers 22 sliding in longitudinal bores 23 of the table. Said comb is biased toward the outward position by springs 26 and its stroke is limited by a dog 27 carried by a finger 22 which moves in a recess 28. In its rearmost position, dog 27 closes the microcontact of a circuit 29 controlling the stoppage of the feeding of jack 9 and a slight motion rearwardly of the table. During the advance of the table, comb 24 comes into abutment against the end face of layer $l_2$ of the frontmost stack of parts in container 16. Said layer is, as explained above, at the level set by sensor 18 controlling jack 14 and is the second layer in the case where layer $l_1$ (FIG. 4) has to be loaded. when a new layer has to be loaded, comb 24 comes to bear against layer $l_1$ already loaded in a pile which is nearer the bottom wall than the new pile in formation, or against said bottom wall, the table being above the layer on which has to be loaded said new layer.

The parts gripping and handling member is, for example for an unloading of parts, made of a crosspiece 30 mounted at the end of the stem of jack 21. Frontwardly of said crosspiece 30 is mounted a flat electromagnetic spool 31 which is articulated at its lower portion 32 at the end of fingers 33 sliding in longitudinal bores of crosspiece 30 and maintained resiliently at its upper portion by springs 34. Fingers 33 are urged by springs 35 and their stroke is limited by dogs 36 moving in a recess 37. At the end of the rearward stroke, one of dogs 36 closes the microcontact of a circuit 38.

When spool 31 is pushed back rearwardly due to its coming into abutment against the frontal face of layer $l_1$, when being advanced by jack 21, dog 36 establishes a contact in circuit 38. Spool 31 is then energized and attracts the parts forming layer $l_1$. The feeding of jack 21 is simultaneously cut. Jack 14 is then released so that container 16 moves downwardly along a settable distance, the parts of layer $l_1$ being thus lifted above parts of layer $l_2$. Jack 21 then moves back rearwardly and brings the layer of parts above shelf 4. At the moment when the parts are above shelf 4, such as position being detected by any known means, the feeding of spool 31 is reduced and then cut. Due to the weight of the parts fixed on the front face of spool 31, the latter tilts about axis 32, the motion being damped by springs 34, until the parts come to bear by one end on shelf 4, then their other end slides on the spool front face until the bed is supported on shelf 4. The feeding of the spool is then completely cut and jack 21 moves the gripping arm rearwardly. Then, jack 9 brings rearwardly table 3 and shelf 4 which carries the layer of parts $l_1$. When jack 11 is below opening 12, it extends, which tilts shelf 4 by rotating about hinge 5 and the parts p forming layer $l_1$ are discharged by passing above the edge 7 of the side wall 6 of frame 1. When the last tube is discharged from shelf 4, a sensor controls the release of jack 11 and shelf 4 moves back downwardly and comes to bear on table 3.

The hereabove described parts gripping and handling device can also be used for loading parts in the container, but it can be simplified since its only function is to maintain the parts in position during the backward motion of the table in order that said parts fall by tilting on the lower layer of parts.

Figure 5:
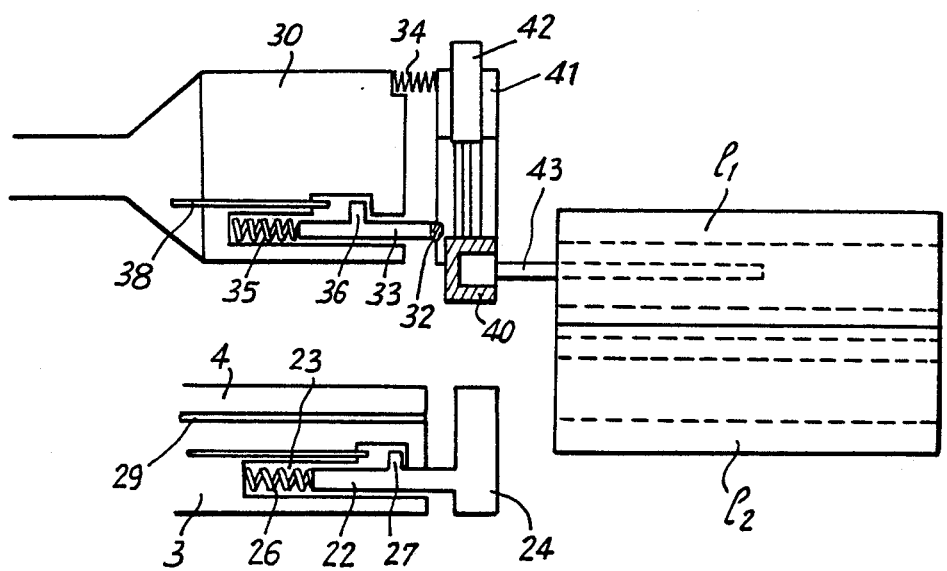
FIG. 5 is a view similar to FIG. 4 of another embodiment.

In the embodiment of FIG. 5, spool 31 is replaced by a second crosspiece 40 which can slide vertically inside slides of a block forming a gripping head 41 under the action of microjacks 42 having vertical axis. In crosspiece 40 are mounted, with a spacing corresponding to the spacing of the tubes p in the layer, tines 43 forming a horizontal comb. The gripping block 41 is mounted on crosspiece 30 in the same manner as the electromagnetic spool 31. When jack 21 moves forward the gripping head 20 thus formed with crosspiece 40 up to the mid-height, the tines 43 engage one inside each tube. When the coming into abutment of crosspiece 40 on the end face of the tubes of layer $l_1$ closes contact 38, the feeding of jack 21 is stopped and microjacks 42 are fed in order to lift crosspiece 40 which entrains with it the tubes of upper layer $l_1$. Jack 21 is then reversed for bringing the tubes hanging on tines 43 above shelf 5. The feeding of microjacks 42 is reversed, which places the tubes on said shelf and jack 21 is then retracted to the maximum and leaves layer $l_1$ on shelf 4, after which the operation goes on as hereabove described with reference to FIG. 4.

Instead of penetrating the tubes of layer $l_1$, tines 43, with adequate width and section, could penetrate the voids between the peripheral surfaces of stacked cylindrical parts.

When elevator plate 13 is in the completely raised position, the return of jack 9 controls the return of jack 14 to its starting position, the stopping of the cycle and the energizing of an acoustic or luminous warning device.

In the hereabove description, the motive members providing the various displacements have been shown and described as hydraulic jacks, but they could be replaced by screw jacks controlled by electrical motors, by racks associated with the output pinions of electrical motors, or by chain or cable elevators.

Such a variant is shown in FIGS. 6 and 7 in which the same reference numerals with index a designate the same parts or equivalent parts. Reference 1a designates the frame, reference 2a the slides which are made of threaded shafts the rotation of which under the action of an electrical motor 9a moves table 3a frontwardly or rearwardly with respect to the frame. Reference 4a designates the shelf articulated at 5a about an axis situated on one of the sides of the table. Reference 6a designates the lateral sides of the frame and reference 11a the pneumatic jack which tilts shelf 4a by a rotation about axis 5a, the head of the stem of said jack extending through an opening 12a formed in table 3a, an opening which is in register with the jack head in the fully retracted position of table 3a. In this position, shelf 4a is in alignment with a chute 45a down which roll the cylindrical parts to be loaded on shelf 4a, or with a chute 44a through which are discharged the cylindrical parts which have been brought onto shelf 4a.

Opposite the front end of the frame is mounted a horizontal elevator plate 13a the vertical displacements of which are controlled by an electrical motor 14a. On the elevator plate 13a can be mounted, by being centered by fittings 15a, a container 16a. The parts gripping and handling member is made of a crosspiece 30a the displacements of which with respect to table 3a are controlled by an electrical motor 21a, references 46a and 50a designate dogs, shown schematically by arrows, which are lifted or moved downwardly, as dogs 46 or door 50, by pneumatic jacks for respectively stopping the parts which roll down onto shelf 4a or in chute 45a.

In the side wall 55a and the bottom of container 16a are provided grooves 56a, 56b in which fit the edges of the removable wall 17, as will be described in more detail hereafter with reference to FIG. 8.

In FIG. 8 is shown a preferential embodiment of the container which allows setting in a simple manner the position of the removable wall 17 as a function of the length of the parts and of the number of piles set in place in the container.

Container 52 comprises a base 53 which allows the stacking, with fixed to said base ring bows forming a loop 54 provided for catching the hooks of elevating means and aligning the containers during stacking. The side walls 55 are formed with vertical grooves 56 in which can engage the side walls of the plate forming the removable wall 17. A plate 57 which occupies only a portion of the length of the container is welded as a bridge on the upper edges of the side walls 52 and bottom 58 for increasing the container rigidity.

What is claimed is:

1. An installation for handling parts between a container in which they are placed in layers and piles and a table, said installation comprising a frame, a table mobile horizontally in one direction along said frame, means displacing in a controlled manner said table along said direction so that its free end protrudes from the frame, at least one container formed of at least one bottom and three fixed vertical side walls, an open side of the container having a width slightly greater than the width of the table free end, elevator means beside the frame in the direction of movement of the table and adapted to move vertically in a controlled manner a said container with said open side in register with the table so that the end of said table can be introduced into said container, means for displacing parts substantially horizontally between the inside of said container and the end surface of the table, the table free end carrying a detection crosspiece for the frontal face of a stack of parts forming a layer situated below a layer of parts to be handled, said detection crosspiece controlling by detection of said frontal face the stoppage of a motor device which controls the advance of the table and its reverse motion over a short distance.

2. An installation according to claim 1, which cooperates with a chute joining the installation to a serviced machine, wherein the end of the table on which are deposited the parts is formed on a shelf articulated to the table about one of its side edges, said shelf coming when the table is in a retracted position into register with the chute joining the installation to the machine to be serviced, and means for varying the inclination of said shelf between a horizontal position and a predetermined inclined position.

3. An installation according to claim 2, wherein the frame carrying the table is formed with an opening on its side edge which comes into register with the chute which joins the machine to be serviced to the installation, said opening being at the level of the shelf edge which is opposite the articulation in the upward position of the shelf, and liftable dogs at the end of said discharge chute and in register with said opening for retaining the parts on said chute when the table opening is not in register with the chute outlet.

4. An installation according to claim 1, wherein the means for displacing substantially horizontally the parts between the inside of said container and the table end surface comprises displacing means movable forwardly and rearwardly with respect to said table, handling means to hold the parts to be handled, a part carrying the handling means rotatably mounted around a horizontal axis at the end of said displacing means between the said displacing means and the handling means, and means being the part carrying the handling means to align said handling means with said displacing means when no parts are carried by said handling means.

5. An installation according to claim 4, wherein the parts to be handled are of a ferro-magnetic material, and the handling means is an electromagnet occupying the whole width of the table carried by said part rotatably mounted around a horizontal axis at the end of the displacing means.

6. An installation according to claim 4, wherein the handling means for the parts to be handled comprises a comb the tines of which come into engagement within the bores of tubular parts to be handled or in the channels between cylindrical parts to be handled.

7. An installation according to claim 1, wherein the table front edge includes a sensor of the surface of the upper layer of parts on which the parts are to be deposited, said sensor controlling the upward motion of the elevator carrying container.

8. An installation according to claim 1, wherein the container open side is engaged, by its side edges, into two vertical slots facing each other and formed in the two side walls of the container perpendicular to the open side, a plurality of slots being provided in each of said side walls.

* * * * *